US006379247B1

(12) United States Patent

Walker et al.

(10) Patent No.: US 6,379,247 B1
(45) Date of Patent: Apr. 30, 2002

(54) METHOD AND SYSTEM FOR AWARDING FREQUENT FLYER MILES FOR CASINO TABLE GAMES

(75) Inventors: Jay S. Walker, Ridgefield; James A. Jorasch, Stamford, both of CT (US)

(73) Assignee: Walker Digital, LLC, Stamford, CT (US)

( * ) Notice: Subject to any disclaimer, the term of this patent is extended or adjusted under 35 U.S.C. 154(b) by 0 days.

(21) Appl. No.: 08/888,962

(22) Filed: Jul. 7, 1997

(51) Int. Cl.[7] .......... A63F 13/00

(52) U.S. Cl. .......... 463/25; 463/23; 273/274; 700/91

(58) Field of Search .......... 463/1, 16–26, 463/29, 42, 47; 273/274

(56) References Cited

U.S. PATENT DOCUMENTS

| | | | | | |
|---|---|---|---|---|---|
| 4,531,187 A | | 7/1985 | Uhland | |
| 5,559,312 A | | 9/1996 | Lucero | |
| 5,570,885 A | | 11/1996 | Ornstein | |
| 5,586,936 A | * | 12/1996 | Bennett et al. | 463/25 |
| 5,613,912 A | * | 3/1997 | Slater | 463/25 |
| 5,761,647 A | * | 6/1998 | Boushy | 463/25 |
| 5,766,075 A | * | 6/1998 | Cook et al. | 463/25 |
| 5,803,808 A | * | 9/1998 | Strisower | 463/11 |
| 5,809,482 A | * | 9/1998 | Strisower | 705/30 |
| 5,811,772 A | * | 9/1998 | Lucero | 463/25 |
| 5,813,912 A | * | 9/1998 | Shultz | 463/25 |
| 5,836,817 A | * | 11/1998 | Acres et al. | 463/26 |
| 5,859,416 A | * | 1/1999 | Gatto | 235/384 |
| 5,957,776 A | * | 9/1999 | Hoehne | 463/25 |
| 6,139,431 A | * | 10/2000 | Walker et al. | 463/20 |

OTHER PUBLICATIONS

Henderson, Danna K, Luck be a lady this flight, 5/94, Air Transport World, New York, all pages.*

Jeff Heinrich, "Airlines get into creative cost–cutting", The Gazette (Montreal), Section: Business; Business Travel; Pg. C9, Friday, May 6, 1994, Final Edition.

Rich Warren, "High Stakes; Airline vendors betting flyers take to gambling ", Chicago Tribune, Section: Transportation; Pg. 5, Zone CN, Sunday, Oct. 30, 1994, Chicagoland Final Edition.

Edwin McDowell, "Modern collectible; dedicated frequent fliers find new mileage sources in a commodity that has taken on a life of its own", Chicago Tribune, Section: Transportation, Pg. 3, Zone CN, Sunday Sep. 17, 1995; Chicagoland Final Edition.

Bruce Orwall, "Playing slots? Casinos know you; spying: sophisticated technology allows casinos to monitor slotmachine players", The Orange County Register, Section: Business, Pg. C01, Tuesday, Dec. 26, 1995; Morning Edition.

(List continued on next page.)

*Primary Examiner*—Jessica J. Harrison
*Assistant Examiner*—John M Hotaling, II
(74) *Attorney, Agent, or Firm*—Dean P. Alderucci

(57) ABSTRACT

A method and system for rewarding complimentary rewards, such as frequent flyer miles, are disclosed. The system includes a plurality of reward counters and a controller coupled thereto. Each reward counter includes an input device capable of receiving input from the dealer to register the complimentary reward. The controller, which is coupled to the reward counters, includes a memory device for storing reward information received from the reward counters. Such reward information includes, in alternate embodiments, the number of the gaming table where the reward is made, the dealer identification number, the date of the reward, the player's player identification number, and the quantity of reward points, such as the number of frequent flyer miles. A method for receiving complimentary rewards and an apparatus for tracking such rewards are also disclosed.

20 Claims, 11 Drawing Sheets

OTHER PUBLICATIONS

Mead Jennings, "Aces high; in–flight gambling on airlines", Airline Business, Section: vol. 12, No. 7, Pg. 56, ISSN: 0268–7615, Jul. 1996.

F. Lisa Friedman, "Getting their ducks in a row" International Gaming and Wagering Business, Section: Pg. S10: ISSN: 8750–8222: Aug., 1996.

Robyn Taylor Parets, "The newer DEAL", International Gaming and Wagering Business, Section: Pg. 27; ISSN: 8750–8222: Apr. 1997.

Descriptive information: "PitTrak Player Tracking System, PitTack Workstations, PitTrak RailReaders".

Slot–Management Systems Track Frequent Players Slot––machine–player–tracking systems give instant feedback to management, Sergio Lalli, Hotel & Motel Mgmt, Nov. 5, 1990, p. B12.

Casinos gamble on direct mail, Murray Raphel, Direct Marketing, v.54, n10, 2/92, p. 32.

"Cashless" Casino, Thanks to Computers: Mashantucket Pequot Tribe's casino is networked to the hilt, Jack O'Neil, Lan Times, vol. 9, Issue 18 Sep. 29, 1992, p. 57.

Targeting The Field, Robyn Taylor Parets, International Gaming and Wagering Business, 9/96, p. S/12.

* cited by examiner

REWARDED MILES DATABASE 722

| AWARD TRACKING NUMBER 810 | DEALER ID NUMBER 812 | TIME OF PLAY IN MINUTES 814 | MILES AWARDED 816 | TABLE NUMBER 818 | FREQUENT FLYER ACCOUNT NUMBER 820 |
|---|---|---|---|---|---|
| 4564245674 | 565 | 75 | 125 | 15 | UNITED 46546546 |
| 1238734336 | 568 | 350 | 510 | 3 | UNASSIGNED |
| 46543543643 | 233 | 200 | 200 | 32 | SOUTHWEST JLJ456464 |

FIG. 8

PLAYER DATABASE 724

| | NAME 910 | PLAYER ID NUMBER 912 | AWARD TRACKING NUMBER 914 | PREFERRED CARRIER FREQUENT FLYER NUMBER 916 | SECONDARY CARRIER FREQUENT FLYER NUMBER 918 |
|---|---|---|---|---|---|
| 920 | BILL SMITH | 6546546 | 12313243213 | DELTA 4354364 | UNITED 594545 |
| 922 | JACK BROWN | 14343433 | 46543543643 | SOUTHWEST JLJ456464 | DELTA 3131313 |
| 924 | JILL KLINE | 12131331 | 321313213133 | CONTINENTAL 9864566 | AMERICAN 31333JJLJ212 |

FIG. 9

METHOD AND SYSTEM FOR AWARDING FREQUENT FLYER MILES FOR CASINO TABLE GAMES

BACKGROUND OF THE INVENTION

1. Field of the Invention

The present invention relates generally to gaming systems and, more particularly, to a method and apparatus for providing table game players with alternate rewards, such as frequent flyer miles, for their wagers.

2. Description of the Related Art

In the highly competitive gaming industry, casinos constantly seek new ways to attract and retain players of table games, such as blackjack, craps, and roulette. This competition has intensified in recent years due to both the number of new casinos and new jurisdictions offering casino gambling. With players having more choices than ever before, it is becoming increasingly difficult for casinos to retain their best customers. With billions of dollars in gaming revenues at stake, casinos have been forced to employ increasingly sophisticated marketing strategies to attract and retain players.

One such way casinos have attempted to attract and retain players is by awarding complimentary rewards known in the industry as “comps.” These comps, which are awarded based on the player's average wager and time played, typically include free drinks, meals, hotel accommodations, and the like. Comp programs, like other reward programs such as frequent flyer reward programs, have been implemented with the expectation of building and maintaining customer loyalty. Casino comp programs also have elements of reward systems similar to those of retailers, such as gas cards offering free gas or credit cards offering free phone minutes for each transaction.

While somewhat successful in retaining customers, casino comp systems have a significant cost associated with their use. In Atlantic City, for example, casinos awarded about $700 million in comps in 1995 alone. Despite the exorbitant actual cost of the comps, players often perceive the value of the typical comp to be limited. Comps such as room upgrades, free meals and drinks must all be consumed within the particular casino that made the offer. Away from the casino, the comps have no value. Expiration dates are also normally tied to these comps, with the value disappearing in as little as a day. Additionally, most casino customers are already invested in existing comp systems such as frequent flyer miles, and would rather build these balances than create new comp balances. Casinos have no way to leverage the value of such comps systems already in place.

Another disadvantage of conventional casino comp systems is the lack of precision inherent in calculating the comp amount. To calculate a comp for a table game such as blackjack, an average bet is observed by supervisory casino personnel, and combined with an estimated hands per hour for the game. After receiving an indication from the player that the gaming session has ended, the casino calculates the time played and the resulting comp value. Player bets, however, may fluctuate dramatically throughout the gambling session. Unless directly observed by casino personnel and entered into the comp system as an adjustment, the variation is unaccounted for. The resulting comp may be inappropriately valued. Similarly, the rate of play may change dramatically depending on the number of players present at a particular gaming table. Once again, unless this figure is updated, comp values calculated will be incorrect, angering customers and resulting in comps having the opposite of the intended effect.

Attempts have been made to further automate comp systems, such as that described in U.S. Pat. No. 5,613,912 to Slater (hereinafter “Slater”), which is directed to a system for automatically rating players. Slater requires a player to log in and out of the system with an identification card. A computer system calculates the player's average wager based upon the time period of the player's play and the minimum wager allowed at the gaming table. If the casino personnel recognize that a particular player has a higher average wager than the minimum wager on the table, then the casino personnel can manually enter the player's average wager. The system uses the average wager information to determine a player's rating. The rating, in turn, is used to determine whether the player has earned complimentary drinks, meals or accommodations.

Slater, however, has several disadvantages. Slater fails to disclose comps other than those typically awarded by casinos. Virtually all casinos offer free drinks, meals and accommodations (See Slater, col. 7, lines 7–12). Thus, even with Slater, players will continue to have a low perceived comp value despite the relatively high costs of operation.

Additionally, Slater suffers from the same problems of imprecision mentioned above. The system stores the minimum wager for each gaming table and the time period of play to calculate an average wager. This average wager, however, is only theoretical, as it is based on the minimum wager allowed at tables and not the player's actual wager. Thus, as previously mentioned, players are likely to question the veracity and accuracy of the system.

Furthermore, Slater is directed to an unduly complicated system. As noted above, the theoretical average bet must first be calculated. Then the player rating must be calculated according to an algorithm (Slater, col. 6, lines 24 et seq.). Only after the system calculates both the theoretical average wager and the player rating are comps awarded.

Lastly, Slater is directed to awarding comps based on historical player data. Specifically, Slater is concerned with a player's average wager and rating over time. Indeed, the player rating is maintained and periodically updated over time. No means for awarding comps based on a single play or on a per-play basis is disclosed.

Thus, a need exists for a method and system for providing a player with rewards, particularly those having a high perceived value and capable of being awarded on a per-play basis.

SUMMARY OF THE INVENTION

The needs identified above are satisfied and a technical advance is achieved by providing, in accordance with one embodiment of the present invention, a system which rewards play of a casino table game with complimentary rewards, such as frequent flyer miles, in addition to any payout based on such play.

In one embodiment of the present invention, a method of receiving complimentary frequent flyer miles is disclosed. The method includes the steps of making a wager on a game, playing the game to a resultant outcome, and receiving a payout based on the outcome. In addition to receiving the payout, which may be zero, the method includes the steps of indicating the end of play of the game and causing data representing a number of complimentary frequent flyer miles to be stored in a database. In alternate embodiments, the number of miles is based on the occurrence of the wager or the amount of the wager.

In another embodiment of the present invention, a method and system of rewarding complimentary frequent flyer miles is disclosed. The method includes establishing a casino table game, tracking player wagering on the game, and awarding a payout based on the outcome of the game. In addition to awarding the payout, if any, the method includes storing electronic data representing a number of complimentary frequent flyer miles and linking the electronic data with stored player identifying information. An apparatus for tracking such complimentary rewards is also disclosed.

BRIEF DESCRIPTION OF THE DRAWINGS

FIG. 8 is a schematic diagram of the rewarded miles database of the casino central controller of FIG. 7;

FIG. 9 is a schematic diagram of the player database of the casino central controller of FIG. 7;

Figure 1:
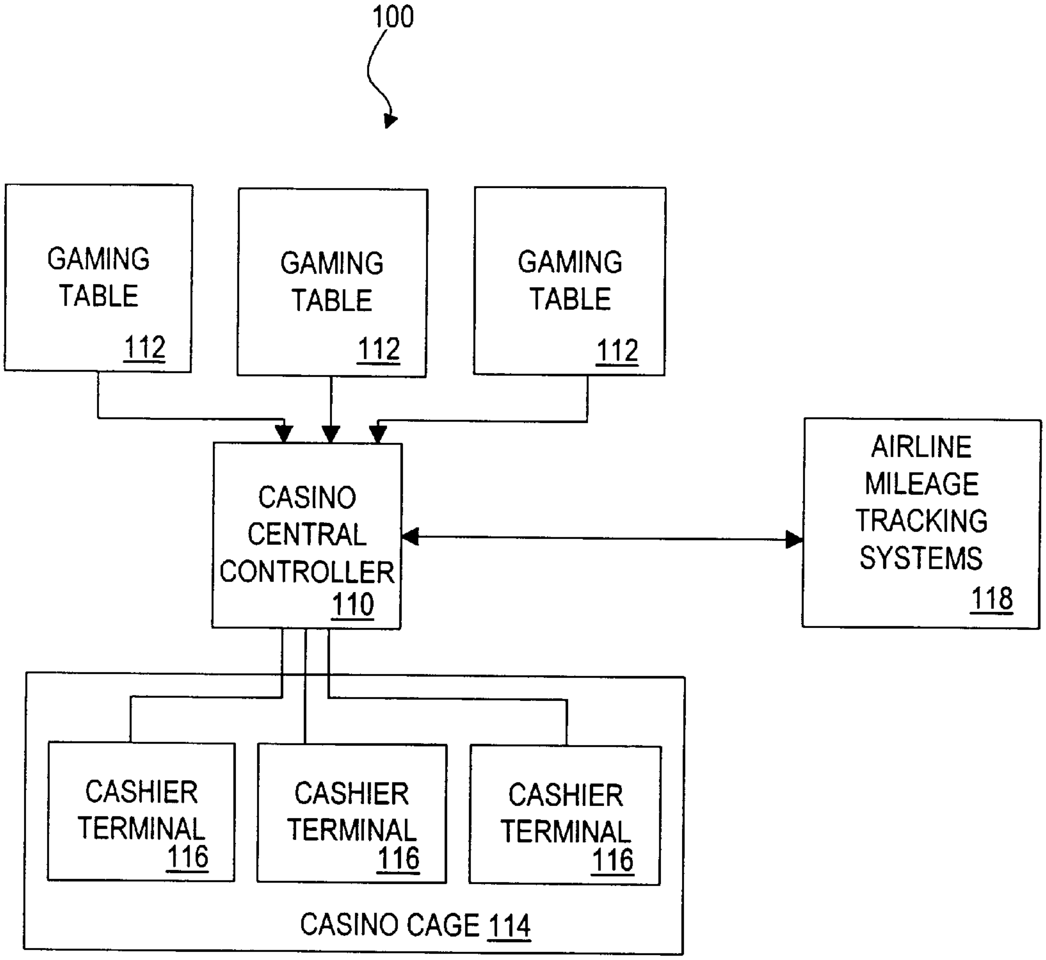
FIG. 1 is an overall schematic of a system according to one embodiment of the present invention.
Figure 11:
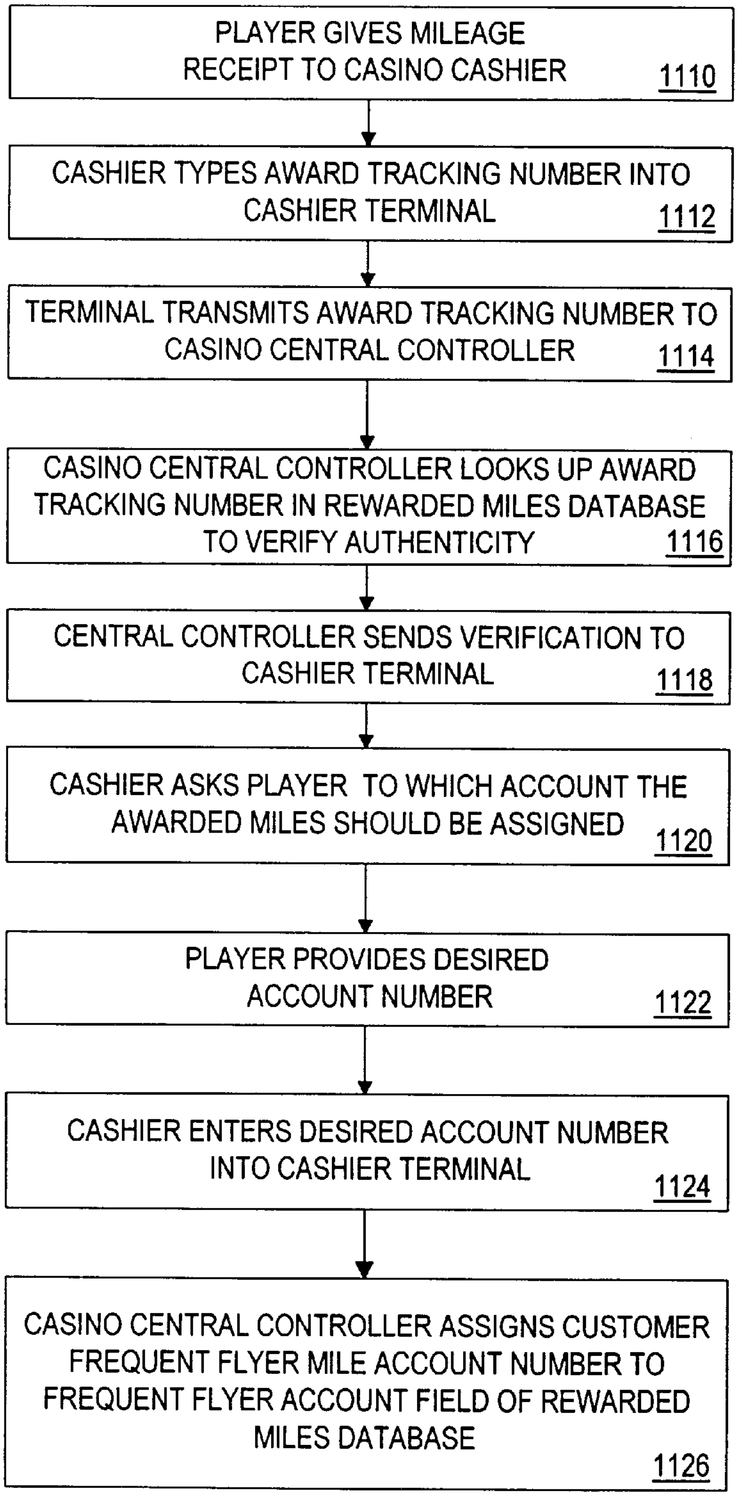
Figure 12:
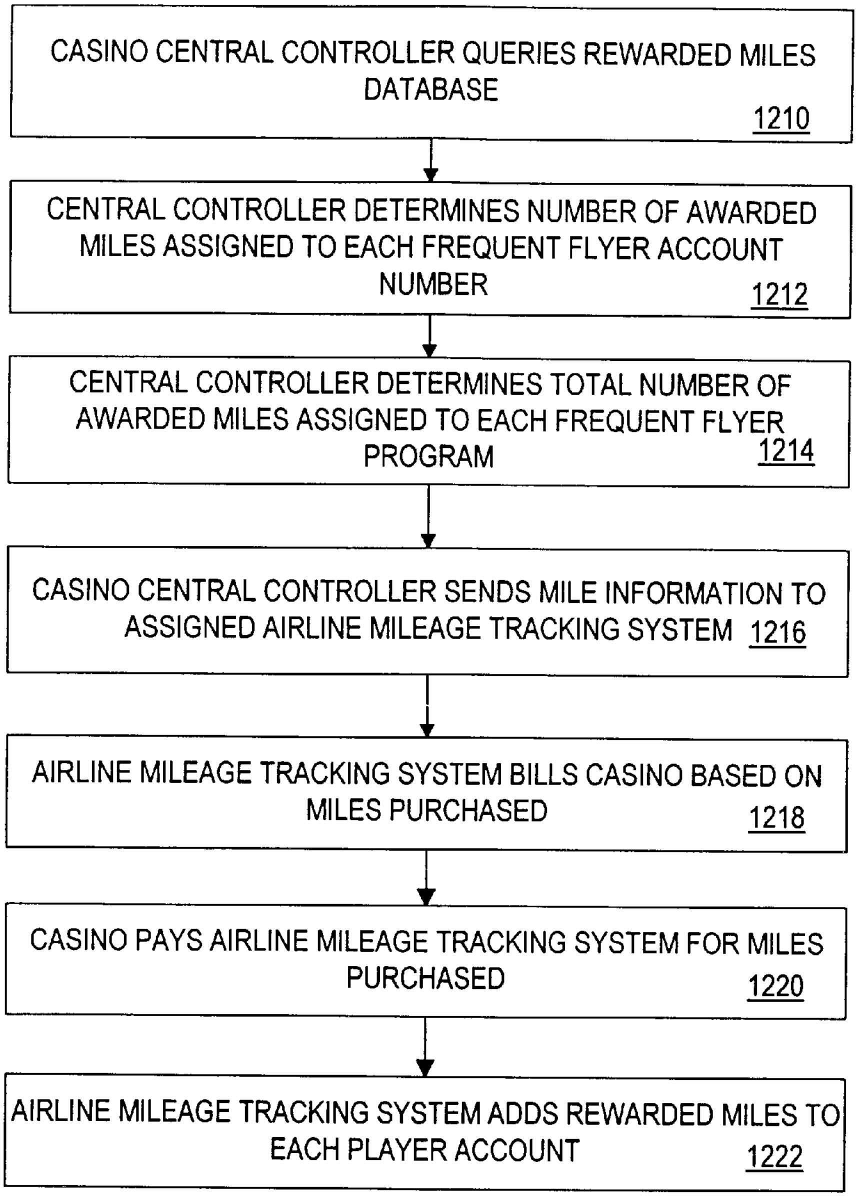

FIGS. **10*a* and 10*b* together represent a flow diagram of the operation of the system of FIG. 1**;

FIG. 11 is a flow diagram of the process of assigning awarded frequent flyer miles to a player's frequent flyer account; and FIG. 12 is a flow diagram of the process of transferring awarded frequent flyer miles to the airline mileage tracking system.

DETAILED DESCRIPTION OF THE PREFERRED EMBODIMENT

Certain preferred embodiments of the present invention will now be described with reference to the drawings. Turning first to FIG. 1, there is shown a system 100 according to one embodiment of the present invention. In general, the system 100 includes a casino central controller 110 (hereinafter "central controller") having a plurality of gaming tables 112 adapted to be in communication therewith. It is to be understood that the gaming tables 112 may be any type, such as blackjack, craps, roulette, poker, and the like, or any combination thereof.

It is also to be understood that the gaming tables 112 are preferably in communication with the central controller 110 via a hardwired communication network such as a local area network or wide area network. Alternatively, the gaming tables 112 can communicate with the central controller 110 via a wireless communication system.

Also in communication with the central controller 110 is one or more casino cage 114. As described in greater detail below, the casino cage 114 is a location in the casino where players redeem frequent flyer mileage receipts. To this end, the casino cage includes a plurality of cashier terminals 116. Like each of the gaming tables 112, each cashier terminal 116 is in communication with the central controller 110.

As described in detail below, the central controller 110 stores records of the number of frequent flyer miles awarded to a given player and assigned to a given frequent flyer account. The central controller 110 is also in communication with each participating airline's mileage tracking system 118 so that this stored information may be transferred to the appropriate airline. Airline tracking system 118 represents a conventional system as operated by a commercial airline to maintain frequent flyer records. Such programs and systems are well known to those of ordinary skill in the art of airline travel.

Figure 2:
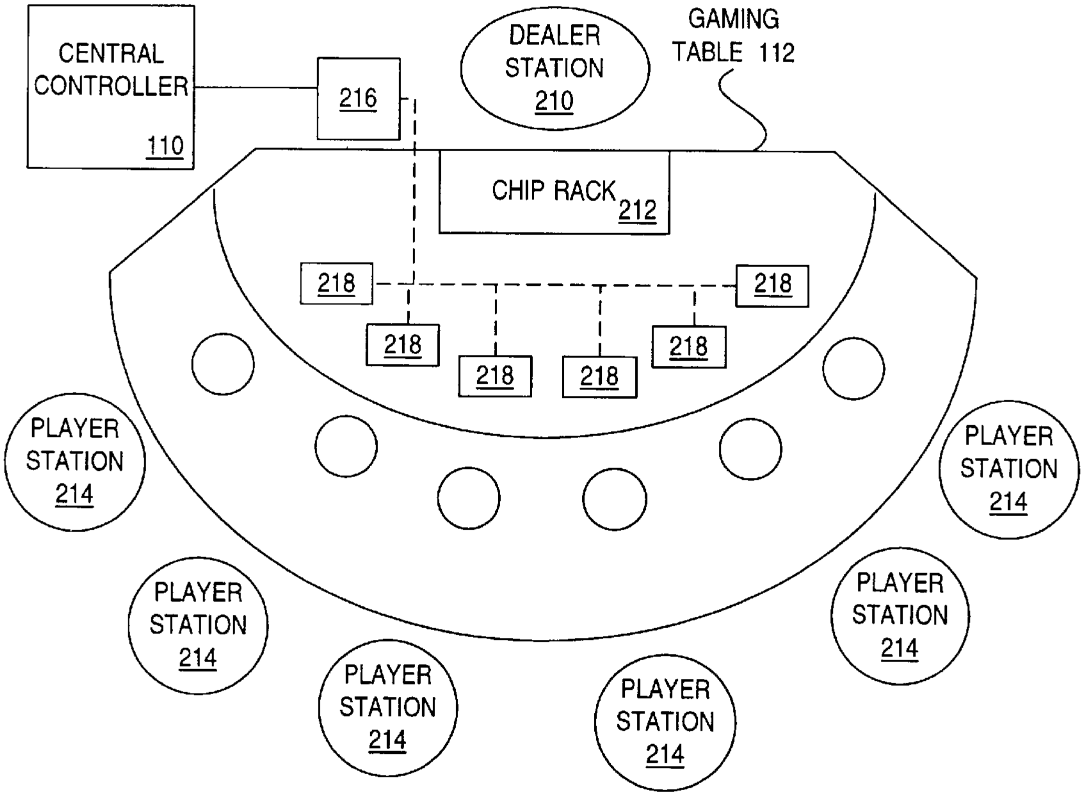
FIG. 2 is a schematic view of a gaming table of the system of FIG. 1.

A gaming table 112 and its associated components will now be described in greater detail with reference to FIG. 2, and continuing reference to FIG. 1. As with existing gaming tables, the gaming table 112 includes a dealer station 210, a dealer chip rack 212, and multiple player stations 214. Unlike typical gaming tables, however, the gaming table 112 includes a table processing unit 216, which is located adjacent to the dealer station 210, and reward or mileage counters 218, each of which is located adjacent to a respective player station 214. All of the mileage counters 218 are in communication with the table processing unit 216, which, in turn, is in communication with the central controller 110.

As described in detail below, in operation, the dealer enters an input into a mileage counter 218 to register a reward of frequent flyer miles for a particular player. In the present embodiment, the dealer input includes the amount wagered by the player. Also described below, the table processing unit 216 communicates reward information to the central controller 110. Such reward information includes any information used to identify or authenticate a reward.

The table processing unit 216 and the mileage counter 218 will now be described in greater detail with reference to FIG. 3. The mileage counter 218 includes a player mile count display 310 for displaying the number of award miles accumulated by each player at the gaming table 112, a dealer mile count display 312 (not visible), for displaying the same information to the dealer, and a series of buttons for use by the dealer.

More particularly, the buttons of the mileage counter 218 include a reset button 320 for resetting the mileage counter 218 and, in the present embodiment, a series of three mile counter buttons 322, 324, 326. Each of the three mile counter buttons 322, 324, 326 correspond to a discrete range of a player's potential wager and, therefore, to a discrete number of miles potentially awarded. For example, the first mile counter button 320 corresponds to a wager below fifty dollars and ten frequent flyer miles; the second mile counter button 322 corresponds to a wager of fifty to one hundred dollars and twenty-five frequent flyer miles; and the third mile counter button 324 corresponds to wagers over one hundred dollars and fifty frequent flyer miles.

As will be appreciated by those skilled in the art, mile counter buttons 322, 324, 326 that correspond to predetermined ranges of wagers and numbers of miles provide several benefits to the casino. Because each mile counter button corresponds to a predetermined range of wagers, during operation the dealer need only press one of the relatively few buttons, rather than enter each player's specific wager on a ten digit keypad. Thus, as described in greater detail below, operation of the system 100 proceeds quickly and is seamlessly incorporated into normal casino play at the gaming table 112. Additionally, casinos can easily correlate a disproportionately high number of miles to the highest range of wagers, thereby encouraging players to wager greater amounts of money.

In an alternate embodiment, however, the mileage counter 218 includes a keypad for entering the exact amount wagered by the player. The mileage counter 218 then multiplies the amount wagered by a mileage factor, such as one-half mile per dollar wagered, to determine the miles awarded. In another alternate embodiment, the mileage counter 218 includes a graduated mileage factor which allows for relatively higher wagers to receive relatively greater miles per dollar. Again, such an embodiment encourages players to wager greater amounts of money, thereby contributing to a casino's earnings.

In yet another alternate embodiment, the dealer inputs the actual reward, or the number of frequent flyer miles awarded. It is to be understood that the dealer input may include, in alternate embodiments, either the amount wagered or the number of miles awarded because the amount wagered and the number of miles are essentially alternate representations of the same information. Therefore, it is also to be understood that the mileage counters 218 are, in alternate embodiments, used to track and accumulate either the amounts wagered or the actual rewards.

Figure 3:
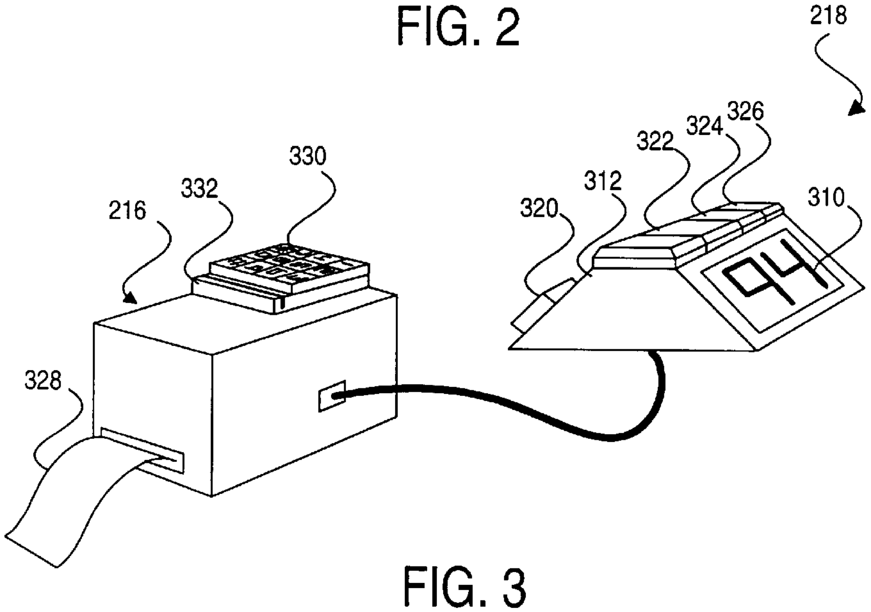
FIG. 3 is a perspective view of the mileage counter and mileage receipt certificate printer of the system of FIG. 1.

Also shown in FIG. 3 is the table processing unit 216. The table processing unit 216, which is coupled to the mileage counters 218, includes a mileage receipt printer (not shown). In the present embodiment, the mileage receipt printer is internal to the table processing unit 216. As discussed in greater detail below, the mileage receipt printer prints a mileage receipt 328 that is provided to a player and indicates the number of miles awarded at the gaming table 112. Although the mileage receipt 328 is shown as a printed receipt in the present embodiment, it is within the scope of the present invention to have mileage receipts that are special chips.

The table processing unit 216 also includes a keypad 330 and a card reader 332. In an alternate embodiment, the card reader is used to read a dealer's unique dealer identification (ID) number from a dealer's identification (ID) card. In one embodiment, the dealer ID card has a magnetic strip which stores the dealer ID number. In another alternate embodiment, the dealer merely enters the dealer ID number via the keypad 330. As discussed below, the dealer ID number, which is communicated to the central controller as reward information, may be used for casino audits or as authenticating information.

Figure 4:
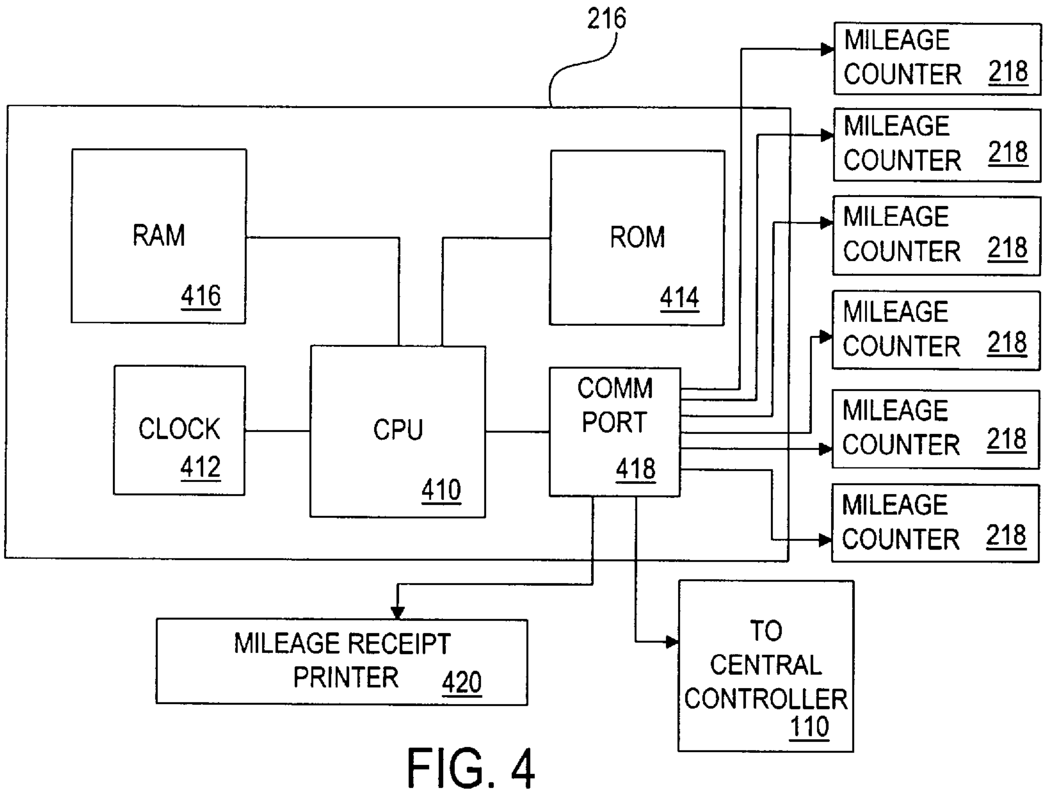
FIG. 4 is a schematic view of the table processor of the system of FIG. 1.

The table processing unit 216 will now be described in greater detail with reference to FIG. 4. The table processing unit 216 includes a central processing unit ("CPU") 410 and an associated system clock 412. The CPU 410 executes instructions according to a program stored in a read only memory ("ROM") 414. In accordance with its operation, as discussed below, the CPU 410 periodically stores and reads data in a random access memory ("RAM") 416 to which it is coupled.

Also coupled to the CPU 410 is a communications port 418. The communications port 418, in turn, is coupled to the mileage counters 218. Therefore, the table processing unit 216 is able to pass data and signals between each mileage counter 218. Because the communications port 418 is also coupled to the mileage receipt printer 420, the CPU 410 is also able to send data and signals, and thereby control, to the mileage receipt printer 420. Lastly, the communications port 418 is coupled to the central controller 110 to allow communication between the table processing unit 216 and the central controller 110.

Figure 5:
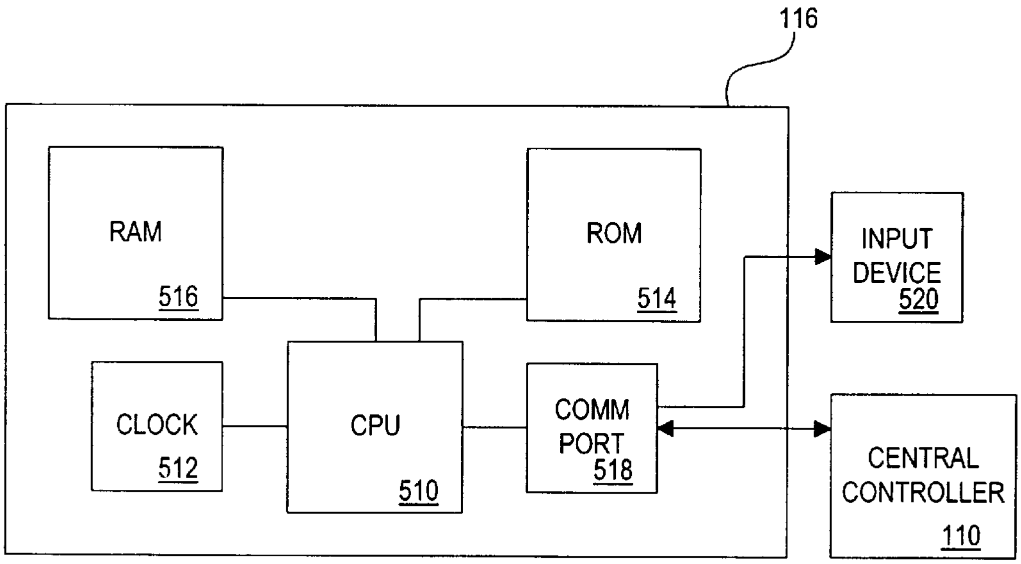
FIG. 5 is a schematic diagram of the cashier terminal of the system of FIG. 1.

The cashier terminal 116 will now be described with reference to FIG. 5. Like the table processing unit 216, the cashier terminal 116 includes a CPU 510 and an associated system clock 512. The CPU 510 executes instructions according to a program stored in ROM 514. During its operation, the CPU 510 periodically stores data in and reads data from RAM 516, to which it is coupled.

Also like the table processor 216, the cashier terminal 116 includes a communications port 518. The communications port 518 provides a communication path between the CPU 510 and the central controller 110, thereby allowing an exchange of data therebetween. An input device 520 is also coupled to the communications port 518 and, therefore, in communication with the CPU 510. It is to be understood that the input device 520 is in alternate embodiments, a keypad, touchscreen, a voice recognition interface, and the like. As described in detail below, the cashier terminal 116 is used by casino personnel to assign awarded miles to a player's frequent flyer account and to transfer the assigned miles to the appropriate airline mileage tracking system 118.

Figure 6:
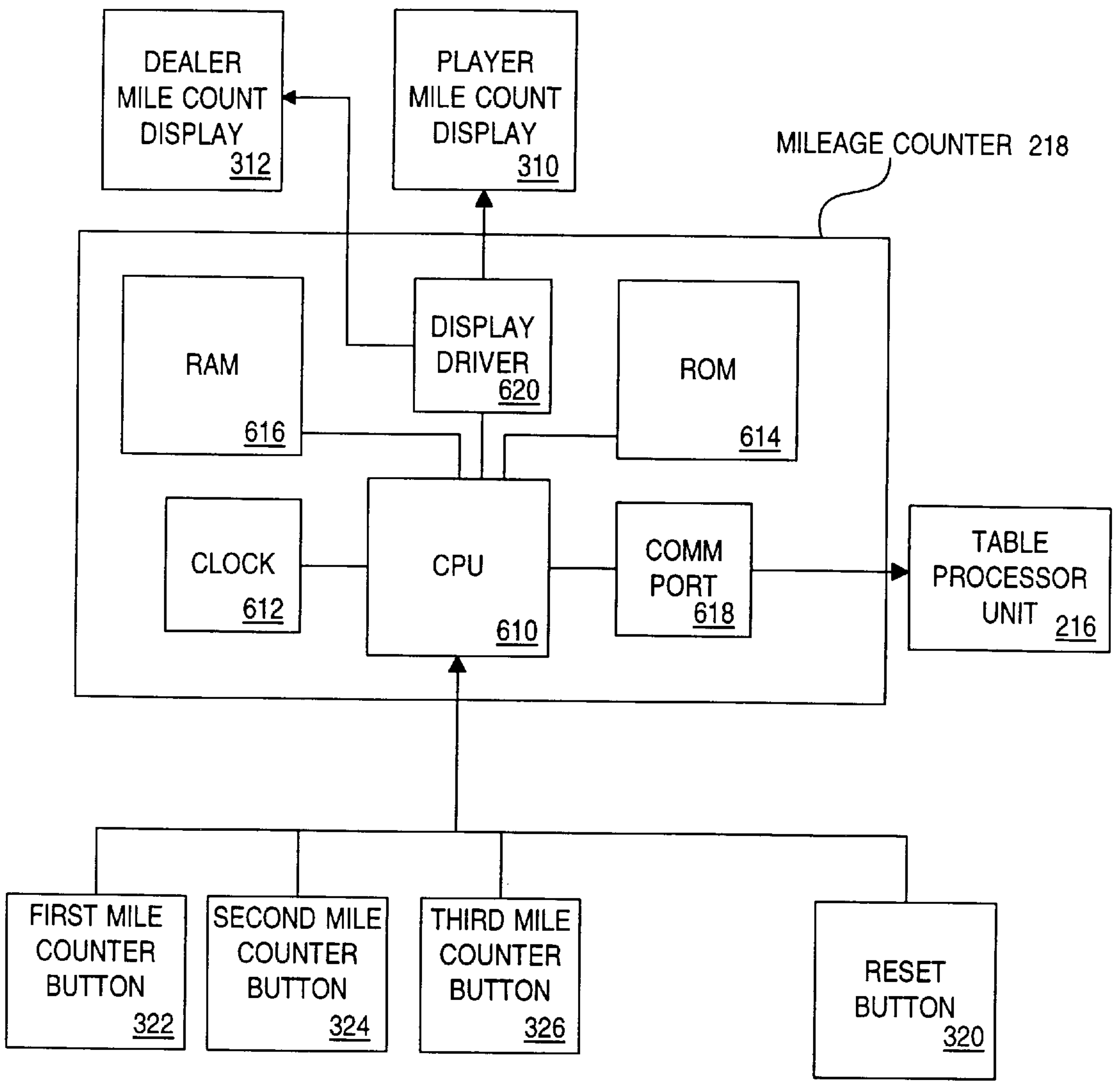
FIG. 6 is a schematic diagram of the reward counter of FIG. 3.

The mileage counter 218 will now be described in greater detail with reference to FIG. 6 and continuing reference to FIG. 3. The mileage counter 218 includes a CPU 610 and an associated system clock 612. The CPU 610 performs instructions according to a program stored in ROM 614. During execution of the program, the CPU periodically stores data in and retrieves data from a RAM 616 coupled thereto.

As noted above, the mileage counter 218 also includes a player mile count display 310 and a dealer mile count display 312. In order to control the output of these displays 310, 312, a display driver 620 is interposed between the CPU 610 and the displays 310, 312.

Also noted above, the mileage counter 218 includes the reset button 320 and the first through third mile counter buttons 322, 324, 326. Each of these buttons are also coupled to the CPU 610. It is to be understood that these buttons and the corresponding signals may be implemented in any number of ways, including in hardware, as a toggle switch, touchscreen, or the like, and/or in software, as a software flag, for example.

Lastly, the mileage counter 218 includes a communications port 618 to which both the CPU 610 and the table processing unit 216 are coupled. Thus, the mileage counter 218 and the table processor 216 may freely exchange information as necessary. Furthermore, because the table processing unit 216 is coupled to the central controller 110, the mileage counter 218 may exchange information with the central controller 110.

Figure 7:
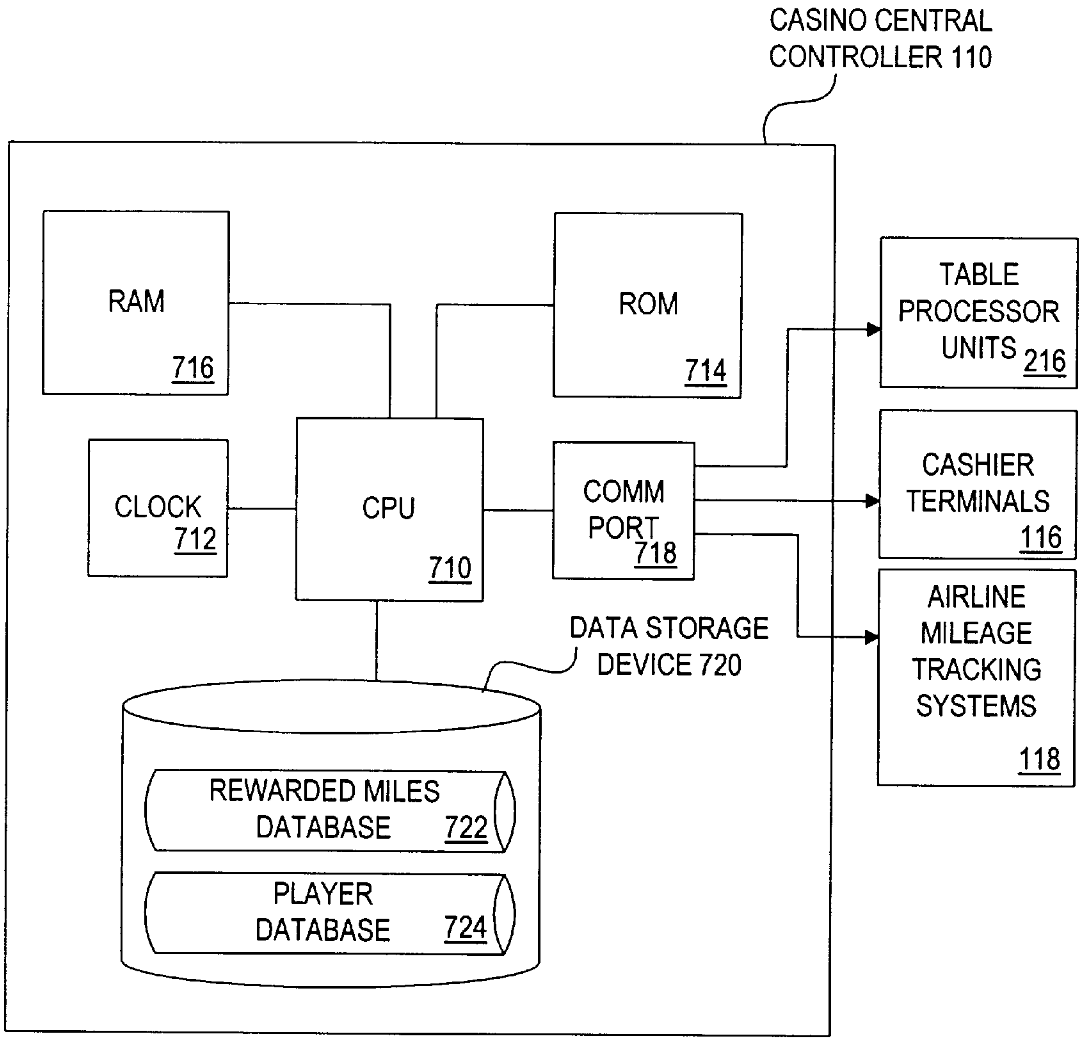
FIG. 7 is a schematic diagram of the casino central controller of the system of FIG. 1.

The central controller 110 will now be described with reference to FIG. 7. As with the previously described components of the system 100, the central controller 110 includes a CPU 710 and an associated system clock 712. The CPU 710 executes instructions according to a program stored in a ROM 714. During the execution of instructions, the CPU 710 stores data in and retrieves data from a RAM 716 coupled thereto.

The central controller 110 also includes a communications port 718 coupled to the CPU 710. The communications port 718 allows the central controller 110, via its CPU 710, to communicate with the other components of the system 100. Specifically, the communication port 718 is coupled to the table processing units 216, cashier terminals 116, and airline mileage tracking system 118.

In order to manage the information generated by the system 100, the central controller 110 includes a data storage device 720, such as one or more magnetic, optical, or suitably equivalent disk drives. Within the data storage device 720, the central controller 110 maintains a rewarded miles database 722, which stores information regarding awarded miles, and a player database 724, which stores information regarding each player.

The rewarded miles database 722 will now be described with reference to FIG. 8. The rewarded miles database 722 includes a record concerning each award of mileage, as identified by an award tracking number. Specifically, each record includes an award tracking number field 810, a dealer identification (ID) number field 812, a time of play in minutes field 814, a miles awarded field 816, a table number field 818, and a frequent flyer account number field 820.

As discussed in greater detail below, the system assigns an award tracking number to each individual award of frequent flyer miles. This number is stored in the award tracking number field 810. Each dealer in the casino has an individual and unique identification number ("ID"). The ID number of the dealer that awarded the miles, identified by the award tracking number 810, is stored in field 812. The duration of play required to achieve the awarded miles 816 is stored in the time of play field 814. Field 816 stores the number of miles awarded corresponding to the award tracking number 810. In the present embodiment, each gaming table 112 has a unique number. The number of the table at which the mileage award corresponding to the award tracking number 810 was made is stored in field 818. Lastly, the frequent flyer account number field 820 stores the account number to which the miles awarded 816 have been assigned. If the miles have yet to be assigned, then an indication that such miles are unassigned is stored in the frequent flyer account number field 820.

It is to be understood that the different fields in the rewarded miles database 722 serve different functions. For example, the dealer ID number field 812 and the table number field 818 may be used to identify abnormally high awards of miles by any particular dealer. As described below, such information may also be used to authenticate awards of miles by encoding such information into the award tracking number 810. Similarly, the time of play in minutes field 814 may be used to check whether the relationship between the amount wagered and the number of miles awarded is acceptable to the casino. Use of the remaining fields in the rewarded miles database 722 will be described below, in connection with the flow diagrams of FIGS. 10–12.

The player database 724 will now be described in greater detail with reference to FIG. 9. In general, the player database 724 includes multiple records 920, 922, 924, each of which correlates player identifying information with a particular award of mileage. Such player identifying information includes the player's name, as stored in the name field 910, the player's identification (ID) number, as stored in the player ID number field 912, and the player's frequent flyer accounts. The player's frequent flyer accounts are stored in the preferred carrier frequent flyer account field 916 and the secondary carrier frequent flyer account field 918. The player database 724 also includes an award tracking number field 914.

It is understood that inclusion of the award tracking number field 914 allows information in the player database 724 to be correlated with information in the rewarded miles database 722 for the same award tracking number. Thus, for example, based on the information in the player database 724, record 922, "JACK BROWN" received an award of miles having an associated award tracking number 914 of "46543543643." Locating this award tracking number 810 in the rewarded miles database 722 indicates that, for this particular award of miles, Mr. Brown received 200 miles, as indicated in the miles awarded field 816. Mr. Brown assigned these miles to his frequent flyer account number "South West JLJ456464." Furthermore, Mr. Brown won these miles by playing at table number 32, as indicated in the table number field 818, played for 200 minutes, as indicated in the time of play in minutes field 814, and was awarded the miles by the dealer having the ID number 233, as identified in field 812. It should be noted that correlation of the data between the player database 724 and the rewarded miles database 722 could also be made based upon the frequent flyer account information in field 820 of the rewarded miles database 722 and fields 916 and 918 of the player database 724.

It is to be understood that alternate arrangements of stored data are also within the scope of the present invention. For example, the two databases 722, 724 may be combined into a single database. Additionally, not all of the fields are necessary for implementation of the present invention. For example, the name field 910 may be omitted, thereby allowing for an anonymous award of miles.

Figure 10A:
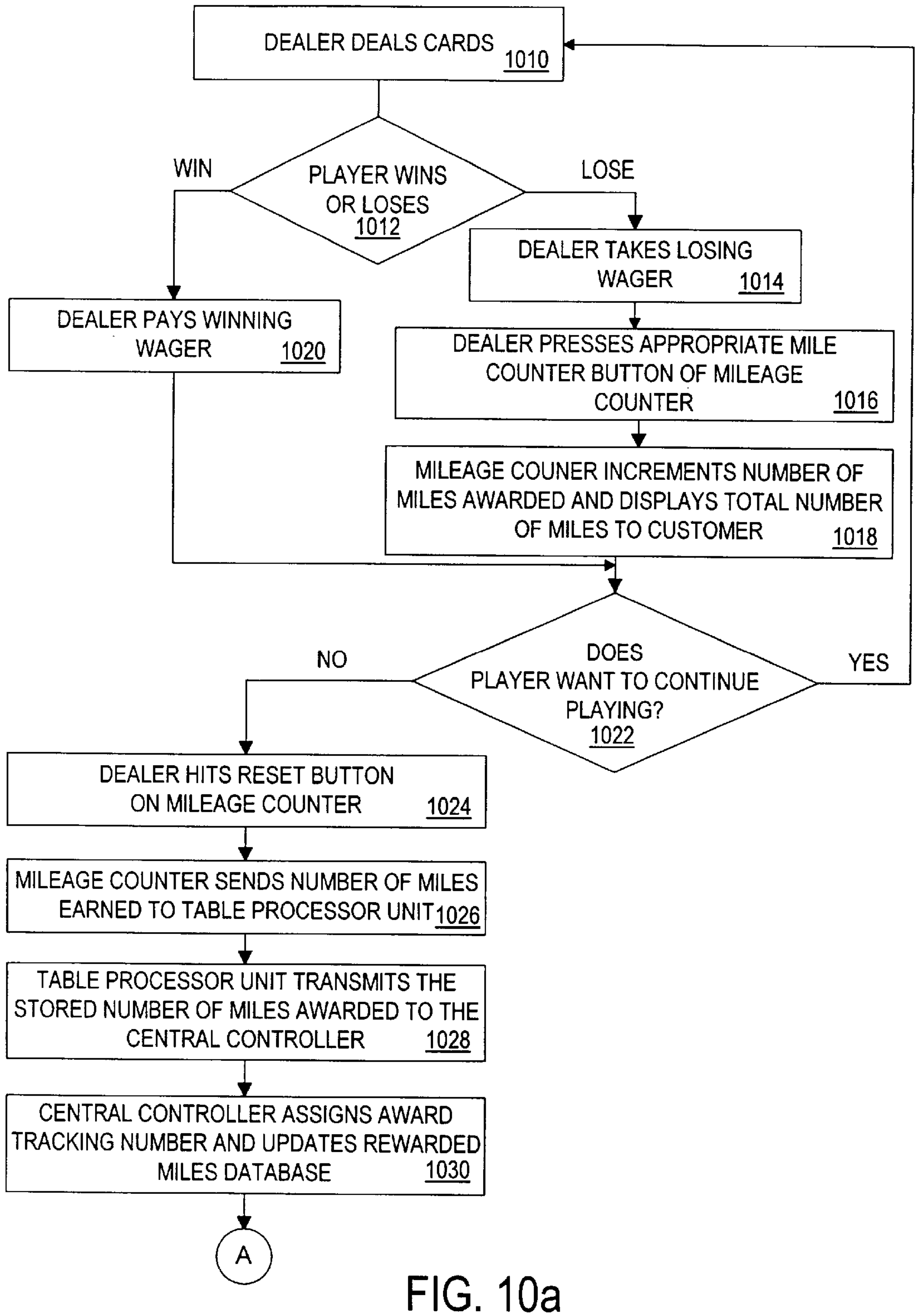
Figure 10B:
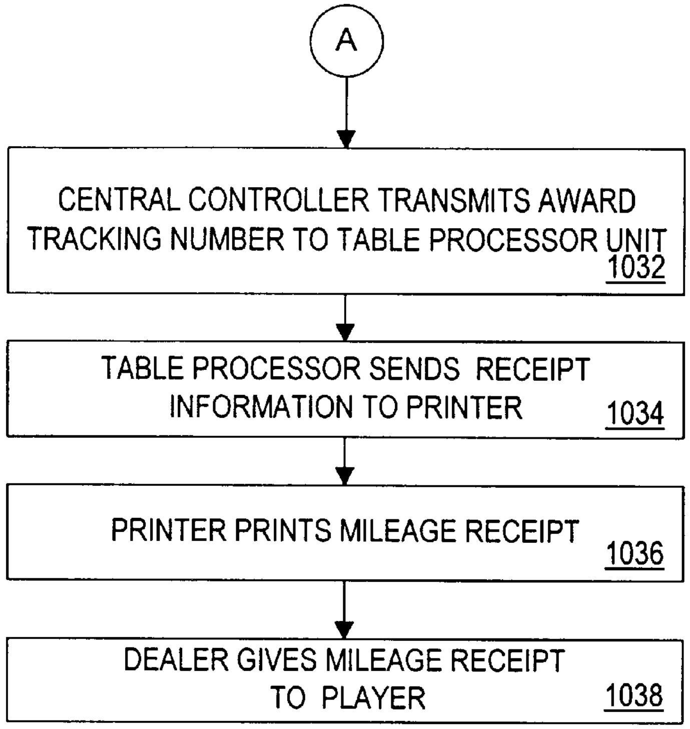

Having thus described the components of the system 100, operation of the system 100 will now be described with reference to FIGS. 10*a* and 10*b* and continuing with reference to FIGS. 4, 6 and 7. It is to be understood that the operation of the system, as described below, is controlled primarily by programs stored within the respective components 216, 116 and 110 and executed respectively in the ROMs 414, 614, 714 of the system components. Initially, in step 1010, the dealer deals the playing cards. Once the hand is played, the dealer determines whether the player wins or loses in step 1012. If the dealer determines that the player has lost, then, in step 1014, the dealer takes the losing wager. As the dealer takes the losing wager, he proceeds to press the appropriate mile counter button 322, 324, 326 of the mileage counter 218. Pressing the appropriate mile counter button 322, 324, 326, shown in step 1016, requires virtually no additional time as the dealer is able to press the button in the same motion as taking the wager.

Pressing a mile counter button 322, 324, 326 causes the mileage counter 218 to increment the number of miles awarded to this particular mileage counter 218 in step 1018. The total number of miles awarded to each mileage counter 218 is stored in the RAM 616 of that mileage counter 218. The mileage counter 218 also displays the total number of miles awarded to the player associated with the particular mileage counter 218.

If, in step 1012, the dealer had determined that the player had won, then the dealer would have paid the winning wager. The step of paying the winning wager is shown in step 1020. As thus described in the present embodiment, miles are preferably awarded only for a losing wager. By awarding only for losing wagers, a casino may attract and retain players and, at the same time, reduce the typically high costs of comp systems. Specifically, players will remain playing because even if they lose money, they win miles. Of course, it is within the scope of this invention to award miles to all players, both winners and losers, based on each player's wager.

The goal of every casino is to make the gambling experience enjoyable such that players return to gamble more. Another feature of the present invention is that the miles awarded tend to provide incentive for the player to come back at a later date. The casino is more willing to spend one hundred dollars on frequent flyer miles if it will bring players back to the casino to gamble more. For example, the casino could offer restricted frequent flyer miles whereby the player is rewarded with even larger amounts of miles. These restricted frequent flyer miles would only be good for return trips to that gambling location (e.g. Las Vegas), thereby increasing the likelihood of future business from that player.

After the dealer has either paid the winning wager in step 1020 or caused the mileage counter 218 to increment the number of miles awarded in step 1018, the dealer determines in step 1022 whether the player wants to continue playing. If the player desires to continue, then the operation of the system 100 continues with step 1010. On the other hand, if the player desires to stop playing, then the operation is continued with step 1024.

In step 1024, the dealer hits the reset button 320 on the mileage counter 218. Pressing the reset button 320 causes the mileage counter 218 to transmit the number of miles awarded to the table processing unit 216. Communicating the number of miles awarded to the table processing unit 216 occurs in step 1026.

Once the table processing unit 216 receives the number of miles awarded, it proceeds to transmit the number of miles awarded to the central controller in step 1028. Also in step 1028, the table processing unit 216 transmits the table number, dealer ID number, and time of play to the central controller 110. The table number is pre-programmed into the table processing unit 216 and the dealer ID number is entered by the dealer via either the keypad 330 or by swiping an identification card into the card reader 332.

After receiving the information in step 1028, the central controller 110 assigns an award tracking number to the information and enters the information in the appropriate fields in a record in the rewarded miles database 722. Entering the information in the rewarded miles database is shown in step 1030. Once the central controller 110 assigns the award tracking number and updates the rewarded miles database 722, the central controller 110 proceeds to transmit the award tracking number to the table processing unit 216 in step 1032.

Once the table processing unit 216 receives the reward tracking number 810, it proceeds to send receipt information to the mileage receipt printer 420. In the present embodiment, the receipt information includes the award tracking number and the miles awarded. In an alternate embodiment, the receipt information also includes the player ID number so that only a particular player may redeem the extended miles. Communication of the receipt information from the table processing unit 216 to the mileage receipt printer 420 is shown as step 1034.

Upon receiving the receipt information, the printer 420 prints the mileage receipt 328 in step 1036. The dealer retrieves the mileage receipt 328 and, in step 1038, gives the mileage receipt 328 to the player.

It is to be understood that speed of play is of paramount importance to a casino because the speed of play is directly proportional to the amount wagered by players and won by the casino. Based on the foregoing description, it will be apparent to those skilled in the art that operation of the present embodiment proceeds without disrupting or slowing normal play. Dealer intervention is minimal, involving pressing a mile counter button 322, 324, 326 when retrieving a player's wager and hitting the reset button 320 when a player leaves the gaming table 112. Therefore, fluidity of play remains and the speed of play is unaffected.

The process of assigning awarded miles to a frequent flyer account will now be described with reference to FIG. 11. Initially, in step 1110, the player goes to the casino cage 114 and gives the mileage receipt 328 to the casino cashier. Then, in step 1112, the cashier types the award tracking number, which is printed on the mileage receipt 328, into the cashier terminal 160. Once the cashier enters the award tracking number, the cashier terminal 116 transmits the number to the casino central controller 110. Transmitting the award tracking number to the casino central controller 110 is shown as step 1114.

Having received the award tracking number, the central controller 110 accesses the rewarded miles database 722 and searches for the received award tracking number. This searching, shown as step 1116, allows the system 100 to verify the authenticity of the mileage receipt 328. Specifically, if the received award tracking number is found in the rewarded miles database 722 and has not been assigned to a frequent flyer account already, then the mileage receipt 328 is deemed authentic. On the other hand, if the award tracking number is not found in the rewarded miles database 722 or if the awarded miles have already been assigned to a frequent flyer account, then the mileage receipt 328 is deemed to be fraudulent. Assuming that the award tracking number is located in the rewarded miles database 722, the central controller 110 proceeds, in step 1118, to send a verification signal back to the cashier terminal 116.

Once the cashier terminal 116 receives the verification, it prompts the cashier to ask the player to which account number the awarded miles should be assigned. Requesting the account number is shown as step 1120.

In response, as shown in step 1122, the player gives the casino cashier the desired account number. The casino cashier, in turn, enters the desired account number into the cashier terminal 116 in step 1124. More specifically, in the present invention, the player simply states that the preferred carrier frequent flyer account 916 should be used.

Finally, having received the account number to which the awarded miles are to be assigned, the central controller 110 assigns the player's frequent flyer mile account number to the awarded miles. Specifically, in step 1126, the central controller 110 accesses the rewarded miles database 722, locates the record having the received award tracking number in field 810, and enters the desired frequent flyer account number in the frequent flyer account number field 820. Thus, the player's awarded miles have been assigned to the specific frequent flyer account.

The process of transferring awarded miles to the assigned airline mileage tracking systems will now be described with reference to FIG. 12. It is anticipated that the process of transferring the awarded miles will take place periodically and will be initiated by casino personnel by selecting a program option at the cashier terminal 116.

As an initial step in the transfer process, the casino central controller 110 queries the rewarded miles database 722 in step 1210. Having queried the database 722, the central controller 110 determines the number of awarded miles assigned to each unique frequent flyer account number. Specifically, in step 1212, the CPU 710 queries the frequent flyer account number field 820 in the rewarded miles database 722 and, for each unique account number, tabulates the total number of miles assigned. This information is stored in RAM 716 or, alternatively, in the data storage device 720. Next, in step 1214, the central controller 110 determines the total number of awarded miles assigned to each frequent flyer program for each airline. Again, this is achieved by the CPU 710 searching the frequent flyer account number field 820 and tabulating in memory the total number of awarded miles for each such program.

Having determined the total number of awarded miles assigned to each frequent flyer account number, as well as the total number of awarded miles assigned to each airline frequent flyer program, the central controller 110 sends this mileage information to the appropriate airline mileage tracking system 118. Sending this information to the airline mileage tracking system 118 is shown as step 1216. It is to be understood that the communication between the central controller 110 and the airline mileage tracking system 118 may occur via a hard-wired connection, as in the present invention, or may be some other type of communication. Such hard-wired connections include wide area networks, connections over a public switch network, and the like. In an alternate embodiment, communication between the central controller 110 and the airline mileage tracking systems 118 occurs via wireless communication systems. In another alternate embodiment, communication of the mileage information includes simply generating a written report containing the mileage information and sending it to the airline.

Once the airline receives the mileage information from the central controller 110 or casino, the airline mileage tracking system 118 bills the casino based on the miles purchased in step 1218. Sometime thereafter, as shown as step 1220, the casino pays the airline mileage tracking system 118 for the miles purchased. Finally, upon receiving payment, the airline mileage tracking system 118 adds the rewarded miles to each player's account in step 1222.

Based on the above description of the present embodiment, it is to be understood that several other hardware and software arrangements are within the scope of the present invention. Thus, in an alternate embodiment, the functions of the table processing unit 216 are incorporated into each mileage counter 218. In another alternate embodiment, the mileage counters 218 accumulate player's wagers. These wagers are communicated to the central controller 110, which correlates the accumulated wagers to a reward of a number of frequent flyer miles.

Furthermore, it is to be understood that several alternate embodiments, which include variations on the above described use of the mileage receipt 328, are within the scope of the present invention. For example, although the previously described embodiment included a printed mileage receipt 328, such a mileage receipt 328 is not required. In one alternate embodiment, a player logs onto the system 100 by swiping a player tracking card through a card reader connected to each mileage counter 218. Because the player tracking card includes player identifying information, such as the player I.D. number 912, the central controller 110 is able to associate the miles awarded on a particular mileage counter 218 with a particular player I.D. number 912.

In this embodiment, when the dealer hits the reset button 320, the player I.D. number 912 and the miles awarded are sent to the central controller 110 where they are stored in the appropriate fields in the rewarded miles database 722 and the player database 724. Thus, a record is created in the player database 724 containing the received player I.D. number in field 912 and the assigned award tracking number in field 914. Similarly, a record is created in the rewarded miles database 722 having the assigned award tracking number in field 810 and the miles awarded in field 816.

In order for the player to assign the miles awarded 816 to a particular frequent flyer account 820, the player simply approaches the casino cage 114 and presents the player tracking card to a casino cashier. The casino cashier, in turn, swipes the player tracking card through a card reader which transmits the player I.D. number stored on the card to the central controller 110. The central controller 110 accesses the player database 724 and locates the record containing the received player I.D. number in field 912. The central controller 110 reads the award tracking number from field 914 of that same record, and then locates the record in the rewarded miles database 722 having that same award tracking number in field 810. The miles awarded 816 have thus been located and may be assigned as described above with reference to steps 1120–1126 of FIG. 11.

As described with reference to FIGS. 10–12, the mileage receipt 328 is essentially a bearer paper, capable of being assigned to any account chosen by the bearer of the physical mileage receipt 328. Thus, the miles on a lost or stolen mileage receipt 328 can be used by anyone. In order to prevent the use of a mileage receipt by someone other than the deserving player, the mileage receipt in an alternate embodiment includes the player ID number printed thereon. Based on the player ID number printed on the mileage receipt, the cashier terminal prevents the associated awarded miles from being assigned to another player's account.

In another alternate embodiment, the dealer need not issue a mileage receipt at the end of a player's gaming session. Instead, the dealer issues a mileage receipt for each individual wager or play. Such individual mileage receipts are distributed by the dealer as an alternative to pressing one of the miles counter buttons 322, 324, 326.

In order to ensure the authenticity of the individual mileage receipts, certain information may be included thereon. Specifically, each mileage receipt may include the date of issuance, the number of the table issuing the mileage receipt, and the award tracking number. Either one or both of the date of issuance and the table number may be encrypted into the award tracking number. When the player attempts to assign the awarded miles to a frequent flyer account, the central controller 110 decrypts the award tracking number, thereby obtaining a decrypted date of issuance and table number. The decrypted date of issuance and table number are communicated to the cashier terminal 116 and the casino cashier. Only if the decrypted date of issuance and table number match those printed on the mileage receipt will the miles actually be awarded. It should be noted that the same type of cryptographic authentication may be employed with any of the mileage receipts described herein.

In another alternate embodiment, no mileage receipts are used at all. In such an embodiment, each player is issued a player tracking card having a unique player I.D. number stored thereon. When the player is issued a player tracking card, the player provides a frequent flyer account number, which is stored at the central controller 110. The account number is with the associated player's I.D. number. In operation, the player logs onto the system 100 by swiping the player tracking card through a card reader coupled to the mileage counter 218. When the player decides to stop playing, the accumulated miles awarded and the player I.D. number are communicated to the central controller 110. The central controller 110, in turn, automatically assigns the awarded miles to the frequent flyer account previously provided. As will be appreciated by those skilled in the art, such an embodiment has the advantage of allowing each player to remain on the casino floor and to continue playing at a gaming table or gaming device, rather than walking to the casino cage 114 to assign the miles awarded.

Additionally, it is to be understood that the present invention may be employed for tracking and accumulating reward points other than frequent flyer miles. For example, in an alternate embodiment, the dealer inputs into reward counters 218 a number of comp points or wagers that are correlated by the system 100 to comp points. The central controller 110 stores the reward points as it does frequent flyer miles in the previous embodiments. The reward points, rather than being transferred to an airline, are accumulated by the central controller 110. The casino, via the central controller 110, monitors each player's reward point total and, based on predetermined limits, offers qualifying players complimentary benefits based on their reward point total.

Although the present invention has been described in terms of certain preferred embodiments, other embodiments that are apparent to those of ordinary skill in the art are also intended to be within the scope of the present invention. Accordingly, the scope of the present invention is intended to be limited only be the claims appended hereto.

What is claimed is:

1. A system for rewarding play at a gaming table having a station for a dealer and a plurality of stations for a respective plurality of players, the system comprising:

a plurality of reward counters, each reward counter associated with a respective one of said plurality of players and including:

an input device for receiving input from said dealer to register a complimentary reward for said respective player, wherein said input device includes a reward counter button corresponding to a wager of said respective player; and a display for displaying an indicia of said complimentary reward to said respective players;

said system further comprising:

a controller coupled to said plurality of reward counters to receive reward information from said reward counters, said controller including a memory device for storing said reward information.

2. The system of claim 1 wherein said complimentary reward includes a number of complimentary frequent flyer miles.

3. The system of claim 2 wherein said controller further comprises a processor configured to assign an award tracking number to said reward information, and wherein the system further includes a printer coupled to said controller for printing a reward receipt having said award tracking number thereon.

4. The system of claim 3 wherein said processor is further configured to authenticate said reward receipt.

5. The system of claim 4 wherein said processor is configured to authenticate said reward receipt based on said reward information, said reward information including information selected from the group comprising: a gaming table number; a dealer identification number; a date; said player identifying information; and said number of complimentary frequent flyer miles awarded.

6. The system of claim 3 further comprising a cashier terminal coupled to said controller, said cashier terminal including a processor configured to communicate said award tracking number to said controller for verification.

7. The system of claim 1 wherein said input device includes a series of reward counter buttons, each of said buttons corresponding to a wager of one of said plurality of players.

8. The system of claim 1 wherein said input is an indication of a wager by said respective player and wherein each of said reward counters further includes a processor configured to correlate said indication of said wager to said complimentary reward.

9. The system of claim 8 wherein said indication of said wager is a range in which said wager falls.

10. The system of claim 1 wherein each of said reward counters further includes a tracking card reader for reading player identifying information from a player tracking card, said reward information includes said player identifying information, and said controller further includes a processor configured to associate said complimentary reward with said player identifying information.

11. The system of claim 1 wherein said reward information includes a number of complimentary frequent flyer miles.

12. The system of claim 2 wherein said controller further includes a processor configured to associate said reward information with frequent flyer account information for said given player.

13. The system of claim 12 wherein said controller is configured to communicate said reward information to an airline frequent flyer tracking system associated with said frequent flyer account information.

14. A method of rewarding a player of a table game, the method comprising:

establishing a table game;

receiving a wager on the table game from a player;

awarding a first number of frequent flyer miles to the player if the wager is within a first range;

awarding a second number of frequent flyer miles to the player if the wager is within a second range, the second number of frequent flyer miles being different from the first number of frequent flyer miles and the second range being different from the first range; and awarding a third number of frequent flyer miles to the player if the wager is within a third range, the third number of frequent flyer miles being different from the first and second numbers of frequent flyer miles and the third range being different from the first and second ranges.

15. The method of claim 14, wherein:

the first awarding step includes pressing a first button on a mileage counter;

the second awarding step includes pressing a second button on said mileage counter; and the third awarding step includes pressing a third button on said mileage counter.

16. The method of claim 14, wherein the first range is less than fifty dollars, the second range is fifty to one hundred dollars, and the third range is over one hundred dollars.

17. The method of claim 14, wherein the table game is selected from the group consisting of blackjack, craps, roulette and poker.

18. The method of claim 14, further comprising the step of providing a mileage receipt to the player upon the player indicating end of play, the mileage receipt including an award tracking number, the award tracking number uniquely identifying the mileage receipt.

19. The method of claim 18, further comprising:

receiving the mileage receipt from the player;

verifying authenticity of the mileage receipt by finding the award tracking number in a database;

receiving information that indicates a frequent flyer miles account; and crediting to the indicated frequent flyer miles account frequent flyer miles represented by the mileage receipt.

20. A method of rewarding a player of a table game, the method comprising:

providing a mileage receipt to a player in response to the player playing the table game, the mileage receipt representing a number of frequent flyer miles awarded to the player and the mileage receipt including an award tracking number, the award tracking number uniquely identifying the mileage receipt;

receiving the mileage receipt from the player;

verifying authenticity of the mileage receipt by finding the award tracking number in a database;

receiving information that indicates a frequent flyer miles account; and crediting to the indicated frequent flyer miles account the number of the frequent flyer miles represented by the mileage receipt.

* * * * *